W. R. Johnson.
Stump Elevator.

Nº 88,303.  Patented Mar. 30, 1869.

Witnesses,

Inventor.
Wm R Johnson

WILLIAM R. JOHNSON, OF BINGHAMTON, NEW YORK.

Letters Patent No. 88,303, dated March 30, 1869.

STUMP-EXTRACTOR

The Schedule referred to in these Letters Patent and making part of the same.

*To all whom it may concern:*

Be it known that I, WILLIAM R. JOHNSON, of Binghamton, in the county of Broome, and State of New York, have invented a new and useful Improvement in Stump-Machines, for extracting stumps; and I do hereby declare that the following is a full, clear, and exact description of the construction and operation of the same, reference being had to the accompanying drawings, making a part of this specification, in which—

Similar letters of reference indicate corresponding parts in each figure.

Figure 1:
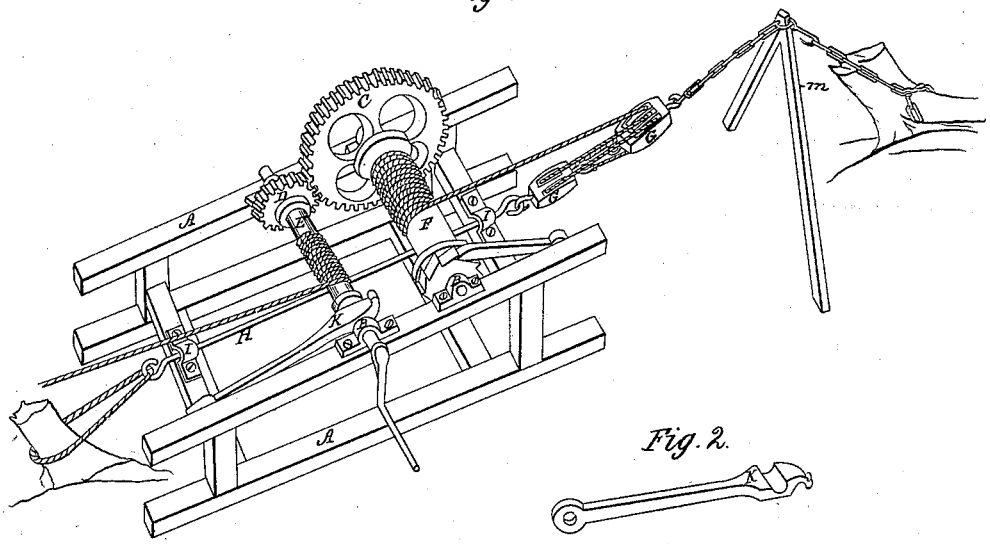
Figure 1 is a perspective view of the machine, engaged in the operation of extracting a stump.
Figure 2:
Figure 2 is an inverted view of the detent, or movable box, detached.

The nature of my invention consists in the construction of a frame, with wheel-gearing, in combination with pulleys and blocks, so arranged that the best mechanical advantage shall be attained, with less complication and liability to derangement than other machines for a similar purpose now in ordinary use.

I construct the base of my frame, A, in a rectangular form, the upper part inclining upward, from the rear to the front end. Upon this inclined plane, I attach boxes B B, for the journals of the wheel and pinion-shafts to work in, so that when the power is applied on a horizontal line, or thereabout, it will have a downward tendency, thereby insuring a more permanent position during the operation.

For ordinary purposes I make the wheel C twenty-two inches in diameter, and the pinion D, five inches.

The pinion-shaft E should be one inch and a half, and the barrel, or drum F, of the wheel, three inches in diameter.

These proportions are found to give the required power and speed, when in combination with the pulleys and blocks G G, which are attached to the forward end of a longitudinal bar, H, running through the centre of the frame. To the other end of this bar the anchor is attached, so that when the power is applied, it prevents the ordinary rack and strain upon the frame that would otherwise come upon it.

Said bar works in bearings I I, on the cross-pieces of the frame, and should have an end play of some inches, for the purpose of adjusting the machine for operation.

To the end of the drum F, I attach a ratchet-wheel for the holding-pawl J, which works on a pin in the side of the frame. One of the journals on the pinion-shaft is made longer than the other, for the purpose of giving sufficient end play, to move it out of gear, so that the shaft may be free to wind the cord upon, and the drum to unwind. When the pinion engages with the wheel, it is held in position by a detent, or movable box, K, which drops on to the exposed journal after the endwise movement of the shaft.

I then attach two pulley-blocks, G G, to the forward end of the bar H; the one to which the stump-chain is attached having three pulleys, and the other, two. I use no wheels, or other appliances for moving, as it can be easily moved by hand from one position to another. The machine may also be operated by hand, by means of cranks.

When I use my stump-machine, I place it in position, and anchor it to a stump, or post, by means of a rope or chain attached to the rear end of the bar H. I then attach a chain, of sufficient length, to the hook on the forward pulley-block, and to the stump to be taken out. Place under the chain, the jack *m*, for the purpose of giving the stump an upward tendency, then slide the pinion out of gear, and wind upon the shaft E the horse-rope. Slide the pinion back into gear, and attach the end of the rope from the forward pulley to the drum F, and the machine is ready for operation.

I am aware that there are other machines in use, similar, in some respects, to my improvement. They are generally mounted on wheels, and the frame subjected to undue strain by an injudicious arrangement of the parts, while my improvement obviates that difficulty by the use of the longitudinal bar H, and placing the bearings of the drum F, and driving-shaft E, on an inclined plane, so that the rope running over the top of the drum has a tendency to press the frame firmly to the ground.

I therefore disclaim any interference with others that have been patented, and confine myself to the novel features of my invention.

What I claim, and desire to secure by Letters Patent, is—

The combination of the longitudinal bar H with the inclined top of the frame, and the mode of holding the driving-pinion in gear by means of the detent K, and the wheel and pinion-gearing with the pulleys and blocks G G, all being constructed as herein described and represented, for the purpose set forth.

WM. R. JOHNSON.

Witnesses:
JOHN T. MYGATT,
CHAS. B. GOODNOUGH.